United States Patent
Uemura et al.

[11] Patent Number: 5,557,971
[45] Date of Patent: Sep. 24, 1996

[54] PRESSURE SENSOR

[75] Inventors: Fumito Uemura; Seiki Kodama; Hiroshi Nakamura, all of Himeji, Japan

[73] Assignee: Mitsubishi Denki Kabushiki Kaisha, Tokyo, Japan

[21] Appl. No.: 355,683

[22] Filed: Dec. 14, 1994

[30] Foreign Application Priority Data

Dec. 17, 1993 [JP] Japan ................................. 5-318543

[51] Int. Cl.⁶ ............................................... G01L 11/00
[52] U.S. Cl. .................................................... 73/702
[58] Field of Search ........................... 73/702, 703, 704, 73/706, 756

[56] References Cited

U.S. PATENT DOCUMENTS

| | | |
|---|---|---|
| 3,745,384 | 7/1973 | Blanchard ................................. 73/702 |
| 4,233,836 | 11/1980 | Yoneda et al. . |
| 5,123,282 | 6/1992 | Ikeda et al. ................................. 73/704 |
| 5,212,989 | 5/1993 | Kodama et al. ........................... 73/706 |

FOREIGN PATENT DOCUMENTS

| | | |
|---|---|---|
| 280969 | 1/1978 | Germany . |
| 4118824 | 6/1991 | Germany . |

OTHER PUBLICATIONS

U.S. application Ser. No. 08/012,401, filed Feb. 2, 1993, Fumito Uemura, entitled Pressure Sensor.

*Primary Examiner*—Richard Chilcot
*Assistant Examiner*—William L. Oen
*Attorney, Agent, or Firm*—Sughrue, Mion, Zinn, Macpeak & Seas

[57] ABSTRACT

A pressure sensor for detecting engine knocking includes a diaphragm 40, and a pressure transmitting medium 10 filled between a pressure sensing element 5 and the diaphragm. The diaphragm has a diameter d and a plate thickness t for enabling the diaphragm to have a resonant frequency substantially equal to the frequency of an abnormal pressure vibration; the diameter d and the plate thickness t satisfy the formula $t=Kd^2$, where $K=3.3\times10^4 \sim 5.3\times10^4$.

3 Claims, 3 Drawing Sheets

PRESSURE SENSOR

BACKGROUND OF THE INVENTION

1. Field of the Invention

The present invention relates to a pressure sensor, and more specifically, to a pressure sensor which has a metal diaphragm and transmits pressure through fluid and is used to sense pressure, for example, when combustion pressure in an engine is measured.

2. Description of the Related Art

FIG. 3 is a cross sectional view showing the structure of a conventional pressure sensor used to measure combustion pressure in an engine, and the like, wherein a generally cylindrical hollow case 1 made of stainless steel such as SUS 304 or the like has a threaded portion 2 formed to the periphery of the case 1 at the lower portion thereof to mount the case 1 on an engine or the like (not shown). The case 1 has a substantially columnar central bore 3 extending therethrough which has a shoulder portion 3a at the middle portion thereof. A stem 7 made of mild steel is disposed on the shoulder portion 3a and a pressure sensing element 5 composed of a semiconductor strain gauge is attached to a glass base 6 adhered to the lower surface of the stem 7. Further, output lines 8 extend through the stem 7 and are electrically connected to the pressure sensing element 5 through bonding wires 9. A waveform or corrugated diaphragm 4, which is made of stainless steel SUS 304 or the like and has a thickness of about 40 µm and a diameter of about 8 mm, is attached to the lower end of the case 1 by, for example, welding, and a pressure transmitting medium 10 composed of liquid such as silicone oil or the like is filled within the central bore 3 between the stem 7 and the diaphragm 4 for transmitting a pressure to be detected.

Next, operation will be described. The diaphragm 4 is disposed in the combustion chamber of an engine or in a pressure transmitting path connected to the combustion chamber. The diaphragm 4 is deformed in accordance with a pressure variation in the combustion chamber, and transmits a pressure to the pressure sensing element 5 through the pressure transmitting medium 10. The transmitted pressure variation in the combustion chamber is converted into an electric signal by the pressure sensing element 5 and the electric signal is output through the lines 8 electrically connected by the bonding wires 9.

The conventional pressure sensor has a problem that although there is a difference of frequency between an output resulting from a pressure variation in a normal operation and an output produced when an abnormal pressure vibration such as knocking and the like is caused, there is no difference between the magnitudes or the of the outputs. Therefore, since it is difficult to discriminate between normal and abnormal, outputs the occurrence of the abnormal pressure vibration such as knocking and the like is difficult to be sensed.

It should be noted that since the conventional pressure sensor uses a diaphragm having a diameter of about 8 mm and a thickness of about 40 µm and has a resonance frequency of 10000 Hz~10300 Hz and further a pressure vibration frequency in the combustion chamber is 5000 Hz~9000 Hz when the abnormal pressure vibration such as knocking and the like occurs, even if the abnormal pressure vibration such as knocking and the like occurs, the diaphragm does not resonate similarly to the case of normal operation and an output having a large gain cannot be obtained. Therefore, the occurrence of abnormal pressure vibration which is different from that occurring in normal operation is difficult to discriminate.

An object of the present invention made to solve the above problem is to provide a pressure sensor having a diaphragm which is resonated in response to abnormal pressure vibration such as knocking and the like in order that the occurrence of abnormal pressure vibration such as knocking and the like can be easily sensed by the resonance of the diaphragm.

SUMMARY OF THE INVENTION

Taking the above object into consideration, this invention provides a pressure sensor, which comprises a case having a detection cavity which has an open end, a pressure sensing assembly disposed in the detection cavity of the case, a diaphragm disposed to seal the open end of the detection cavity, and a pressure transmitting medium filled within the detection cavity, wherein the diaphragm has a resonant frequency equal to the frequency of an abnormal pressure vibration.

According to a further feature, the diaphragm has a substantially disc-shaped outside form and further a diameter and a plate thickness which enable the diaphragm to have a resonant frequency equal to the frequency of the abnormal pressure vibration.

The diameter d (mm) and the plate thickness t (µm) of the diaphragm preferably satisfy a formula $$t = Kd^2, \text{ where } K = 3.3 \times 10^{-4} \sim 5.3 \times 10^{-4}.$$

In the pressure sensor according to the present invention, since the diameter and plate thickness of the diaphragm are set so that the resonant frequency of the diaphragm is made substantially equal to a pressure vibration frequency when an abnormal pressure vibration such as knocking and the like occurs in a combustion chamber, the diaphragm resonates when the abnormal pressure vibration such as knocking and the like occurs so that an output having a large gain can be obtained and thus the occurrence of the abnormal pressure vibration can be easily sensed.

DETAILED DESCRIPTION OF PREFERRED EMBODIMENTS

Figure 1:
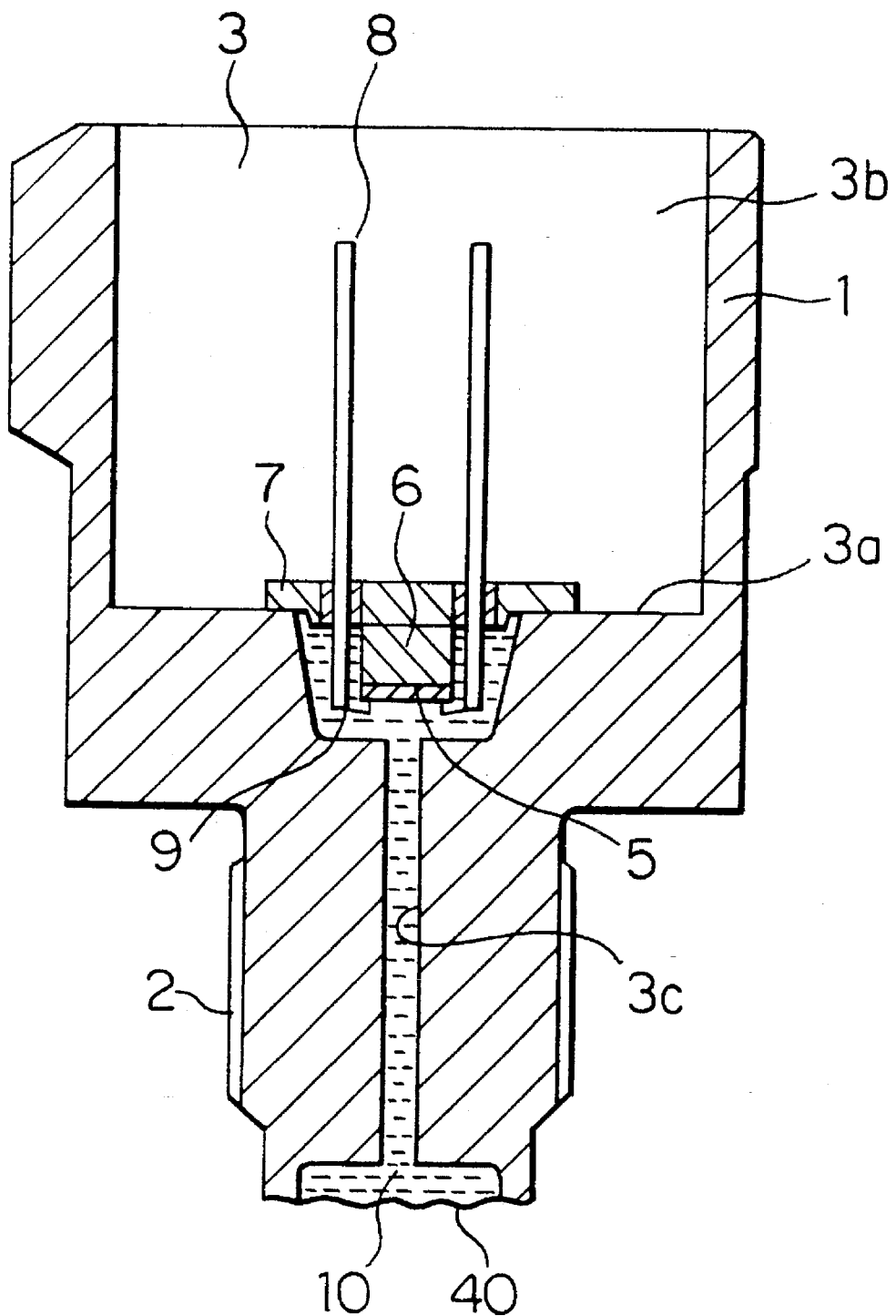
FIG. 1 is a cross sectional view showing the structure of a pressure sensor in an embodiment of the present invention.

An embodiment of the present invention will be described below with reference to the accompanying drawings. FIG. 1 is a cross sectional view showing the structure of a pressure sensor of the present invention, wherein a substantially cylindrical hollow case 1 made of metal such as stainless steel SUS 304 or the like has a threaded portion 2 formed at the lower portion thereof to mount the case 1 on an engine or the like (not shown). The case 1 has a substantially columnar central bore 3 extending therethrough which has a shoulder portion 3a at the middle portion thereof. A stem 7 made of mild steel is hermetically attached to the shoulder portion 3a. A pressure sensing element 5 composed of a semiconductor strain gauge is attached to a glass base 6 which is bonded to the lower surface of the stem 7. Further, output lines 8 which extend upward and downward from the stem 7 are electrically connected to the pressure sensing element 5 through bonding wires 9.

As shown in FIG. 1, the central bore 3 is divided by the stem 7 into a pressure sensing chamber 3c for transmitting a pressure in the combustion chamber of the engine to the pressure sensing element 5 and an output chamber 3b for outputting a signal output from the pressure sensing element 5 to the outside. Further, a diaphragm 40 made of metal such as SUS 304 or the like and formed as a continuous waveform or corrugation is attached to the lower end of the case 1 so that it seals the inside of the pressure sensing chamber 3c. The pressure sensing chamber 3c is filled with a pressure transmitting medium 10 composed of liquid such as silicone oil or the like for transmitting pressure to be detected. Any suitable liquid or the like having a high boiling point other than silicone oil may be used as the pressure transmitting medium 10.

Incidentally, a non-corrugated flat disc plate whose periphery is fixed has a relationship between a resonant frequency f (Hz) and the plate thickness t (μm) thereof represented by the following formula, and it can be found that they have a proportional relationship.

$$f = \{10.21/(2\pi r^2)\} \times [E/\{12(1-v^2)\rho\}]^{1/2} \quad \text{(formula 1)}$$

Note, in the above formula, r is the radius, E is Young's modulus, v is Poisson's ratio, and ρ is the density. As is apparent from the above formula, the value of the resonant frequency f can be reduced by increasing the radius r or reducing the plate thickness t.

Since the above relationship is fundamentally established also in the continuous waveform diaphragm 40 of the present application, an eigen value analysis was effected with respect to the diaphragm 40 using the above formula by means of a limited element method, taking the continuous waveform configuration of the diaphragm 40 into consideration. As a result, the resonant frequency of the diaphragm 40 can be arbitrarily set within the range of 5000 Hz~9000 Hz by suitably selecting the values of the diameter d and thickness t of the diaphragm 40 from the region between a curve 42 and a curve 44 shown in FIG. 2. The curve 42 is a curve on which a resonant frequency of 9000 Hz can be achieved and the curve 44 is a curve on which a resonant frequency of 5000 Hz can be achieved. Therefore, when the resonant frequency of the diaphragm 40 is desired to be set to 5000 Hz, it suffices to select an arbitrary coordinate (t, d) on the curve 44 and when it is desired to be set to 9000 Hz, it suffices to select an arbitrary coordinate (t, d) on the curve 42. The curve 42 and the curve 44 are given by the following formulas, respectively.

$$\text{the curve 42}: t = 5.3 \times 10^{-4} \times d^2 \quad \text{(formula 2)}$$

$$\text{the curve 44}: t = 3.3 \times 10^{-4} \times d^2 \quad \text{(formula 3)}$$

Therefore, it suffices to select the diameter d and plate thickness t of the diaphragm 40 so that they satisfy a formula $$t = Kd^2, \quad \text{(formula 4)}$$

where K is a constant equal to $3.3 \times 10^{-4} \sim 5.3 \times 10^{-4}$.

Figure 2:
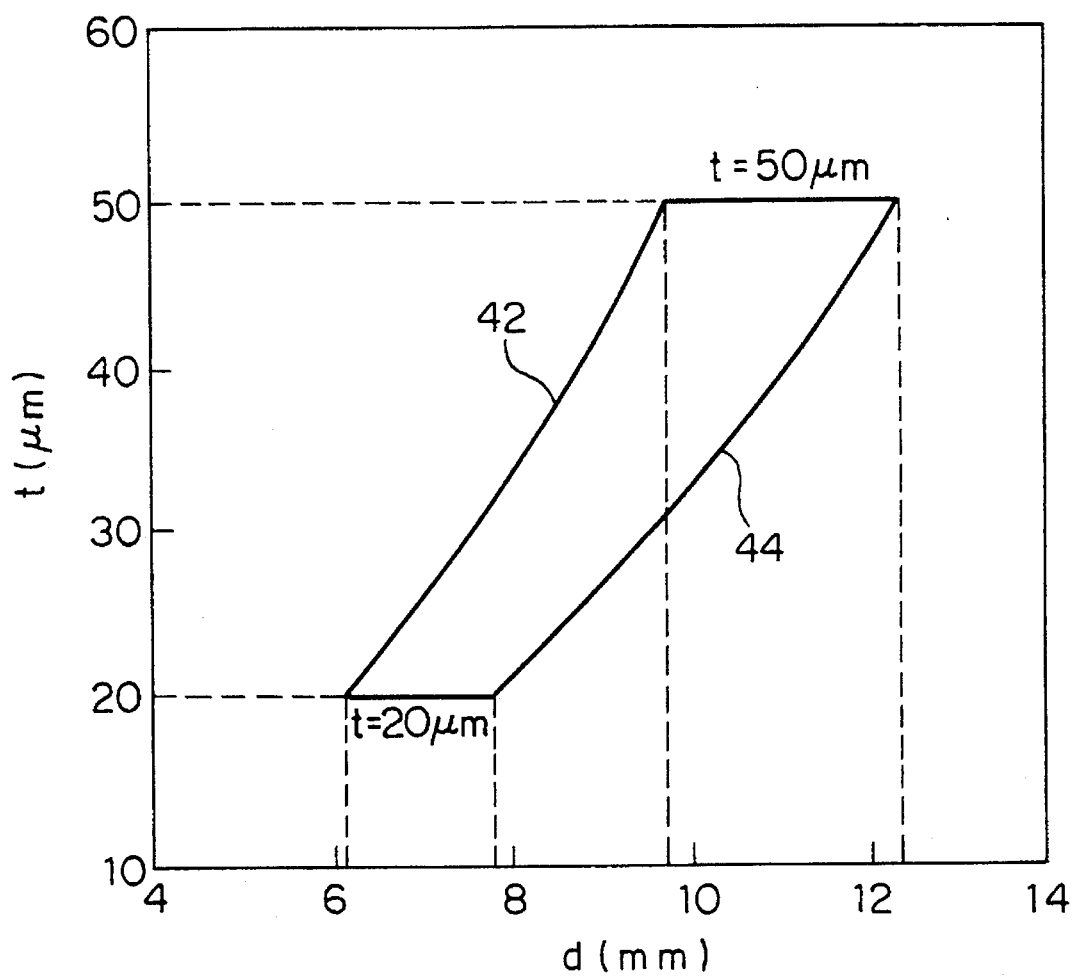
FIG. 2 is a graph showing the range of the diameter and plate thickness of a diaphragm in the embodiment shown in FIG. 1.
Figure 3:
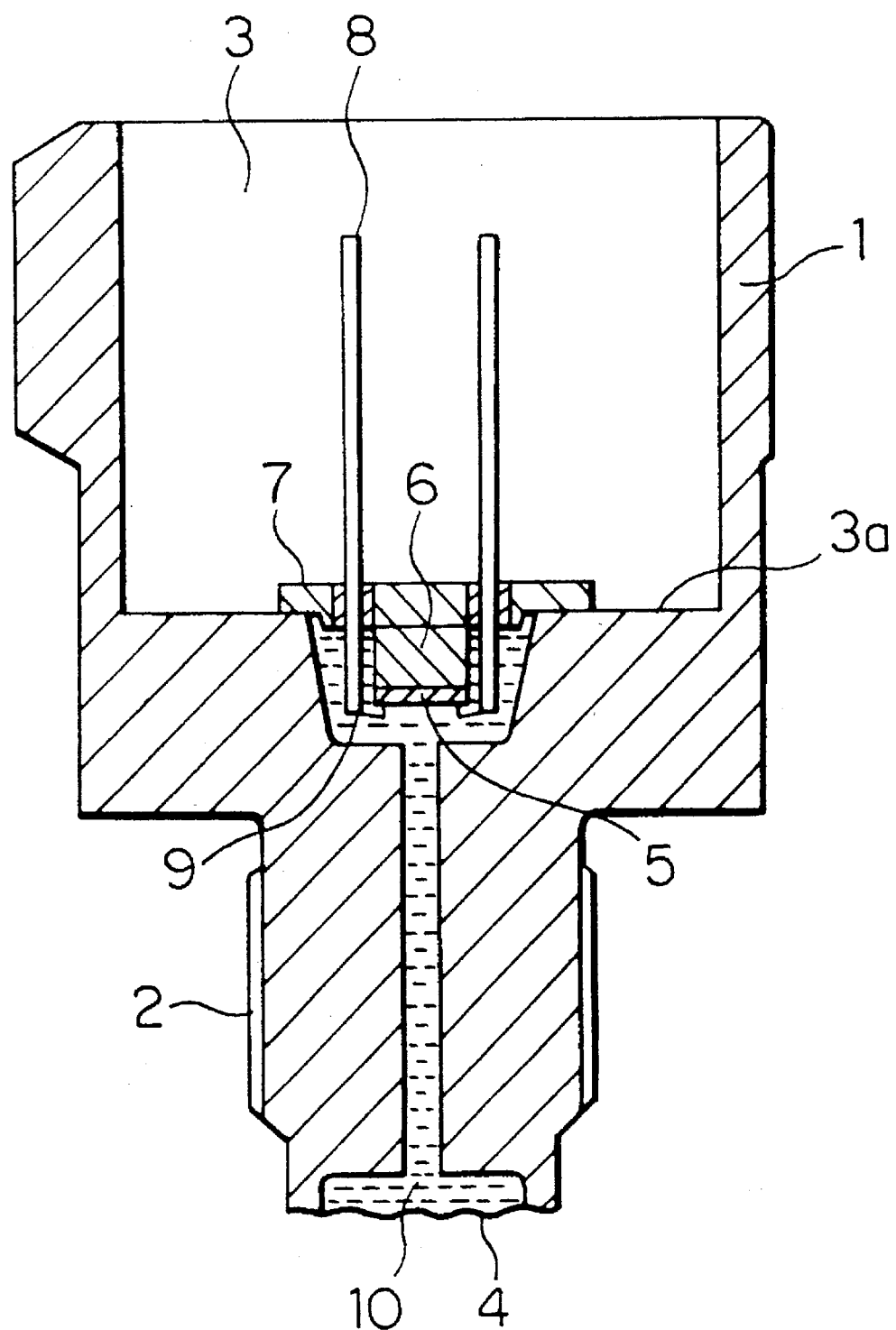
FIG. 3 is a cross sectional view showing the structure of a conventional pressure sensor.

However, since it is known from experience that a continuous waveform diaphragm 40 capable of being forged has the thickness t of 20 μm~50 μm, the practically usable range of the diameter d and plate thickness t lies in the range between the curve 42 and the curve 44 in which the plate thickness t of 20 μm~50 μm can be obtained, as shown by the solid line in FIG. 2. When the diameter and thickness of the diaphragm 40 lie in this range, the resonant frequency of the diaphragm 40 can be made substantially equal to a pressure vibration frequency when an abnormal pressure vibration such as knocking and the like occurs. Therefore, when an engine combustion pressure is sensed by the pressure sensor of this application, a normal pressure vibration frequency in the combustion chamber is 4~85 Hz in a normal operation, whereas the resonant frequency of the diaphragm 40 is 5000~9000 Hz. As a result, in normal operation, the diaphragm 40 does not resonate and a signal having a gain of a usual magnitude is output similarly to the conventional pressure sensor. When an abnormal pressure vibration such as knocking and the like occurs, however, since the frequency of the abnormal pressure vibration is increased and coincides with the resonant frequency of the diaphragm 40, the diaphragm 40 resonates to increase its frequency so that a large amplitude pressure is applied to the pressure sensing element 5. Therefore, an output having a large gain can be obtained from the pressure sensor and the occurrence of the abnormal pressure vibration can be easily discriminated and sensed.

Although the above embodiment is described with respect to the case that the pressure sensor of the present invention is mounted to the engine to sense the combustion pressure of the engine, the embodiment may be also used to sense fluid pressure such as hydraulic pressure, air pressure and the like and can achieve the same effect as that described above even in such cases.

As described above, according to the pressure sensor of the present invention, when the diameter d and plate thickness t of the diaphragm 40 are arranged to satisfy the formula $t = Kd^2$, where $K = 3.3 \times 10^{-4} \sim 5.3 \times 10^{-4}$ (formula 4), the resonant frequency of the diaphragm 40 can be made substantially equal to the pressure vibration frequency when an abnormal pressure vibration such as knocking and the like occurs in the combustion chamber. As a result, since the diaphragm 40 resonates only when the abnormal pressure vibration occurs to thereby obtain an output having a large gain, the occurrence of the abnormal pressure vibration which is different from the pressure vibration in normal operation can be easily discriminated, whereby the occurrence of the abnormal pressure vibration can be easily sensed.

What is claimed is:

1. A pressure sensor for sensing pressure vibrations in a combustion chamber of an internal combustion engine, comprising:

a) a case (1) having a detection cavity (3c) which has an open end;

b) a pressure sensing means (5) disposed in said detection cavity of said case;

c) a diaphragm (40) disposed to seal said open end of said detection cavity; and d) a pressure transmitting medium (10) filled within said detection cavity, e) wherein said diaphragm is substantially disc-shaped, and a diameter d (mm) and plate thickness t (μm) of said diaphragm satisfy a formula $t = Kd^2$, where $K = 3.3 \times 10^{-4} \sim 5.3 \times 10^{-4}$, such that a resonant frequency of said diaphragm lies within a range of abnormal pressure vibration frequencies in the combustion chamber and outside of a range of normal pressure vibration frequencies therein, and an output amplitude of the pressure sensing means is thereby substantially greater for an abnormal pressure vibration than for a normal pressure vibration.

2. A pressure sensor according to claim 1, wherein the diameter d lies between about 6–12 mm, and the plate thickness t lies between about 20–50 μm.

3. A pressure sensor according to claim 2, wherein the range of abnormal pressure vibration frequencies is 5000–9000 Hz.

* * * * *